US006982935B2

(12) United States Patent
Ceshkovsky

(10) Patent No.: US 6,982,935 B2
(45) Date of Patent: Jan. 3, 2006

(54) PAUSE CONTROL FOR A MEDIA PLAYER WITH A MOVABLE PICKUP

(75) Inventor: Ludwig Ceshkovsky, Irvine, CA (US)

(73) Assignee: Discovision Associates, Irvine, CA (US)

( * ) Notice: Subject to any disclaimer, the term of this patent is extended or adjusted under 35 U.S.C. 154(b) by 535 days.

(21) Appl. No.: 09/683,684

(22) Filed: Feb. 1, 2002

(65) Prior Publication Data

US 2003/0147313 A1   Aug. 7, 2003

(51) Int. Cl.
  *G11B 7/085*   (2006.01)
(52) U.S. Cl. ............................ 369/30.12; 369/30.16; 369/44.28; 369/44.29
(58) Field of Classification Search ............ 369/30.12, 369/30.16, 44.28, 44.29
  See application file for complete search history.

(56) References Cited

U.S. PATENT DOCUMENTS

| | | | |
|---|---|---|---|
| 4,286,290 A | | 8/1981 | Pyles et al. |
| 4,307,418 A | | 12/1981 | Mindel et al. |
| 4,403,259 A | | 9/1983 | Masaki |
| 4,694,441 A | | 9/1987 | Tomisawa et al. |
| 4,803,675 A | | 2/1989 | Komatsu |
| 5,323,367 A | | 6/1994 | Tamura et al. |
| 5,351,226 A | * | 9/1994 | Mizumoto et al. ....... 369/47.39 |
| 5,499,223 A | * | 3/1996 | Yanagi et al. ............ 369/44.28 |
| 5,544,165 A | | 8/1996 | Yokota et al. |
| 5,550,799 A | | 8/1996 | Inoue et al. |
| 5,638,346 A | | 6/1997 | Aramaki |
| 5,655,051 A | * | 8/1997 | Furuta et al. ............... 386/105 |
| 5,881,036 A | * | 3/1999 | Ceshkovsky ............. 369/44.28 |
| 5,930,211 A | * | 7/1999 | Sasaki ..................... 369/44.29 |
| 5,978,329 A | * | 11/1999 | Ceshkovsky ............. 369/44.28 |
| 5,982,722 A | * | 11/1999 | Hashimoto ............... 369/44.29 |

* cited by examiner

*Primary Examiner*—Aristotelis M. Psitos
(74) *Attorney, Agent, or Firm*—Steve A. Wong; Micah P. Goldsmith

(57) ABSTRACT

A method and apparatus for suspending the operation of a rotating optical media player that uses simplified and efficient logic circuitry is described. When an operator initiates a pause operation, for example, by pressing a pause key, the current location of an optical pickup (e.g., a value of the current track ID) is stored. Then, a tracking servo loop is opened and a near zero offset is provided to the input of the tracking actuator. The condition of the optical disk system is then maintained in a "wait" state until the operator decides to end the pause process by selecting an alternate operation, such as "Play", "Search", or some other functions. When an alternate operation is received, the tracking servo loop is closed. The system then enters a search mode to reposition the optical head to the position indicated by the track ID, which was previously saved. Finally, the selected function command is activated. In an alternate embodiment, in the case where "Search" is selected during "Pause", the stored location is ignored, the search instead being directed to the desired location associated with the search.

68 Claims, 11 Drawing Sheets

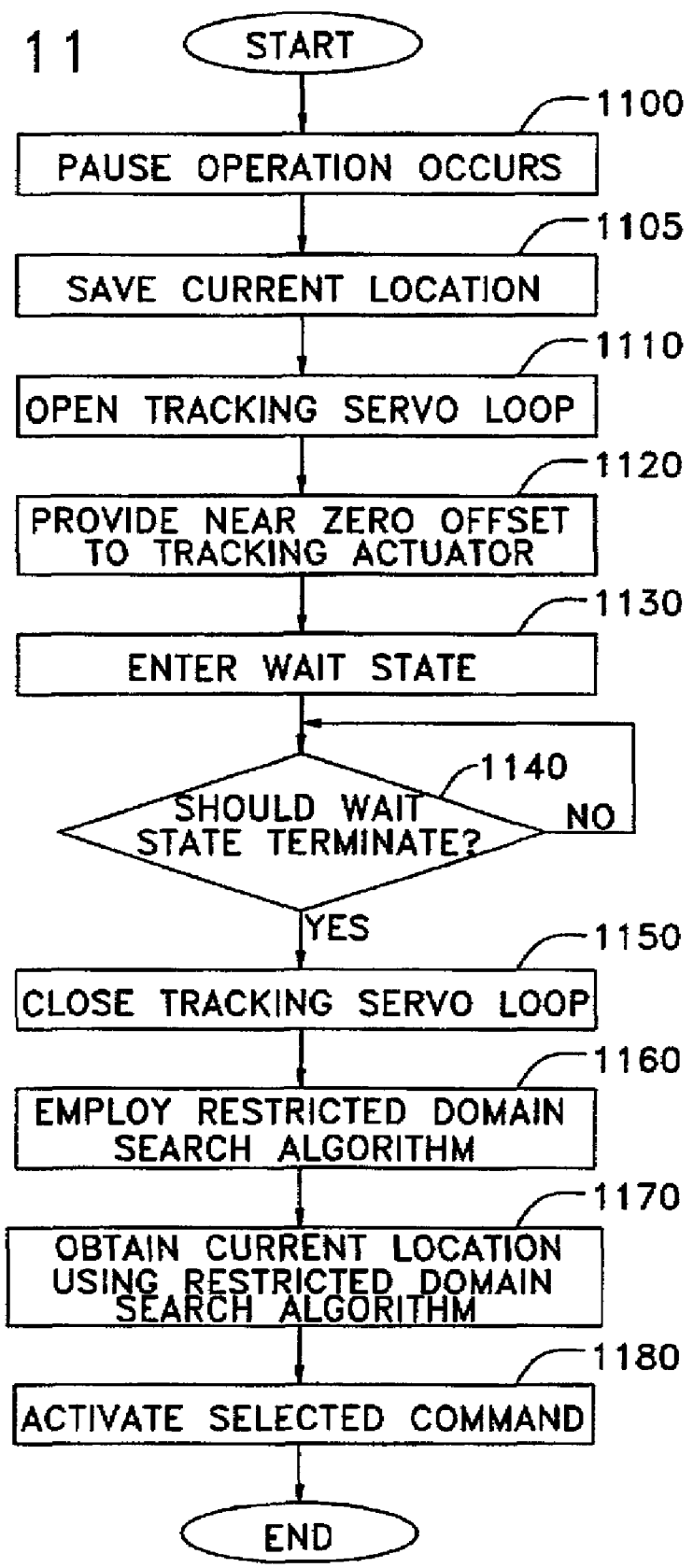

PAUSE CONTROL FOR A MEDIA PLAYER WITH A MOVABLE PICKUP

BACKGROUND OF INVENTION

1. Field of the Invention

The present invention relates generally to rotating optical media players, and specifically, to a method and apparatus which simplifies the requirements for implementing a pause function on a rotating optical media player.

2. Background of the Invention

A pause function is typically initiated when a user presses a pause button on a media player. In response, the media player stops its current activity and waits until the pause function ends. When the pause function ends, the media player usually resumes its prior activity at the same place it was when the pause function was initiated. Current techniques for pausing a rotating optical media player are complicated and require precise and expensive circuitry to implement the pause functionality. The precision and expense of such circuitry make it disadvantageous to implement pause functionality using current techniques. Before further discussing this problem, and overview of rotating optical media players is provided.

Rotating Optical Media Players

A rotating optical media player can be either a device or system that is capable of retrieving information stored by an optical disc, or a device or system that is capable of both recording information to and retrieving information from an optical disc. Examples of devices that are capable of retrieving information from an optical disc include compact disc (CD) players, video laser disc (LD) players, digital video disc (DVD) players, and compact disc read-only-memory (CD-Rom) drives. Examples of devices that are capable of both recording information to an optical disc and retrieving information from an optical disc include recordable mini-disc (MD) players, magneto-optical (MO) disc drives and compact disc recordable (CD-R) drives.

Information is generally stored by an optical disc in the form of concentric or spiral tracks sometimes referred to as information tracks. In the case where information is already stored by an optical disc, the information tracks contain regions of optical contrast that represent the stored information. In the case of an unrecorded or blank optical disc containing preformatted tracks for recording information, a track that will become an information track may or may not have regions of optical contrast. The area located between two information tracks on an optical disc is sometimes referred to as a non-information track.

When an optical storage device is in its normal mode of operation, (i.e. retrieving information from or recording information to an optical disc), the storage device rotates the disc while using a light beam to retrieve information from or record information to the disc. As the optical disc rotates, the light beam radially traverses the disc. While the light beam traverses the optical disc, a tracking servo loop in the optical disc storage device keeps the beam of light centered on the information track, or the track that will become the information track in the case of recording information to a disc.

Tracking Servo

An optical disc tracking servo is a closed loop system that allows a light beam to remain centered on an optical disc information track during normal operation of an optical disc storage device. The tracking servo readjusts the radial position of the light beam by sensing when the light beam drifts off the center of the information track. The tracking servo senses when the light beam is not centered on an information track by measuring the intensity of light reflected by the surface of the optical disc.

Generally, the intensity of light reflected by the surface of an optical disc is the least when it is reflected by the center of an information track. Using this principle, a tracking servo generally senses the intensity of light reflected at one or both edges of an information track to detect when a light beam is drifting off center and to determine in which direction the light beam is drifting. Therefore, a tracking servo system that is in a closed loop mode of operation senses when the light beam floats off the center of the information track by detecting changes in the intensity of light reflected at one or both edges of an information track and moves the beam back into a position where the intensity of reflected light is optimal for center tracking.

In the case where a tracking servo measures the intensity of light reflected at both edges of an information track, the intensity of reflected light that is optimal for center tracking occurs when the intensity of light reflected at both edges of an information track is the same. The same principle holds true for both one and three beam optical disc storage devices. In the case where a tracking servo measures the intensity of light reflected at one edge of an information track, the intensity of reflected light that is optimal for center tracking is based on some calibrated value. The latter method is less favored due to difficulties associated with calibrating an appropriate centering value.

Special Operations

Rotating optical disc media players are generally capable of performing various special operations in response to user input. One such operation is a pause, or still mode operation. Using current techniques, a pause operation is implemented in a manner that is illustrated in FIG. 1. Spiral track 100 of rotating optical medium 101 has a current position 110. The current position is where the laser was located on the spiral track 100 when the pause operation was initiated. The tracking servo remains closed after the pause operation is initiated by the user. Since the tracking servo loop remains closed at this point, the laser continues to spiral around the information track even after the pause operation starts.

When the loop reaches a second point 120, a full track has been cycled through spiral track 100. The second point 120 and the current position 110 are related by a radial line 121 drawn from the center of the medium 101 to its outside edge. Once the second point 120 is reached, the tracking servo loop is briefly opened and special circuitry causes the optical pickup controlling the laser to jump back to position 110, at which time the tracking servo loop is again closed. At this point, the laser continues to spiral to point 120 again and jump back to point 110 until the pause operation terminates.

Causing the optical pickup to jump between points 120 and 110 requires a great deal of precision. Typically the distance between tracks is 2 micrometers, so the jump is across a very small distance. To jump such a small distance, special jump circuitry is needed. Furthermore, the spiral pattern on a rotating disc is not perfect, so even a perfect 2 micrometer jump might not bring the laser to the correct location. Typically with such a small jump, the optical pickup has a tendency to jump to far (i.e., across more than one track), so zero crossing circuitry and break circuitry must also be used in conjunction with the jump circuitry, to sense when the laser has jumped halfway between the two tracks and to keep the pickup from moving too far (i.e., centering it on the next track). As a whole, the pause operation performed in this manner is complex and requires very expensive and precise equipment.

The use of such expensive and precise equipment is disadvantageous. The disadvantage becomes even more problematic and wasteful in media player applications that do not require absolute precision. For instance, when a pause operation is implemented by a user of a CD player who is listening to a song, it might be tolerable to emerge from the pause state at a location on the track that is not precisely where the pause operation was started. Instead, a location that is reasonably close to where the pause operation was started is tolerable. The end result might be a very small gap in the song of one or two notes that would be unnoticeable to the listener. Implementing a pause operation with expensive and complex circuitry in this application is wasteful and unnecessary.

SUMMARY OF INVENTION

An object of the invention is to achieve a pause function in a simplified manner. According to the present invention, when an operator initiates a pause operation, for example, by pressing a pause button on a media player, the current location of an optical pickup is determined and saved. Then, a tracking servo loop is opened and a near zero offset is provided to the input of the tracking actuator. The condition of the optical disk system is then maintained in a wait state until the operator decides to end the pause process by selecting an alternate operation, such as play, search, record, or some other functions. When an alternate operation is received, the tracking servo loop is closed. The system then enters a search mode to reposition the optical head to the position indicated by the current location that was saved when the pause operation began. Finally, the selected function command is activated.

In one embodiment, a search command is selected while in the wait state. In this case, the current location need not be used since the operator desires to move to another location. In this scenario, the stored current location is ignored. Instead, the search is directed to the desired location associated with the search. In another embodiment, the tracking servo loop is opened and closed using a switch. In another embodiment, the current location is saved by reading a track ID located in a sub-code that exists as a property of the pattern imprinted on the spiral or concentric track of the rotating optical medium. In another embodiment, a frame ID is used for constant linear velocity (CLV) discs, such as CD, DVD, and MiniDisc, where a frame within a track is used to record a current location. The term track ID as used throughout this application refers to the use of both a track ID and a frame ID.

In one embodiment, an acceptable amount of error is allowed to be introduced. The introduction of the error further simplifies the process by removing the need to store the current location of the system when the wait state is initiated and to search for the current location when the wait state terminates. In another embodiment, an acceptable amount of error is allowed to be introduced into the system and a limited domain search algorithm is employed within the acceptable error range.

An advantage of the present invention is it simplifies the circuitry and logic needed to implement a pause function because the simplified pause only requires a switch to open the tracking servo loop. Further objects and advantages of the invention will be brought out in the following portions of the specification, wherein the detailed description is for the purpose of fully disclosing preferred embodiments of the invention without placing limitations thereon.

BRIEF DESCRIPTION OF DRAWINGS

The invention will be more fully understood by reference to the following drawings, which are for illustrative purposes only:

FIG. 11 is a flowchart showing the steps taken during a simplified pause that allows for a limited domain search algorithm according to an embodiment of the present invention.

DETAILED DESCRIPTION

Figure 1:
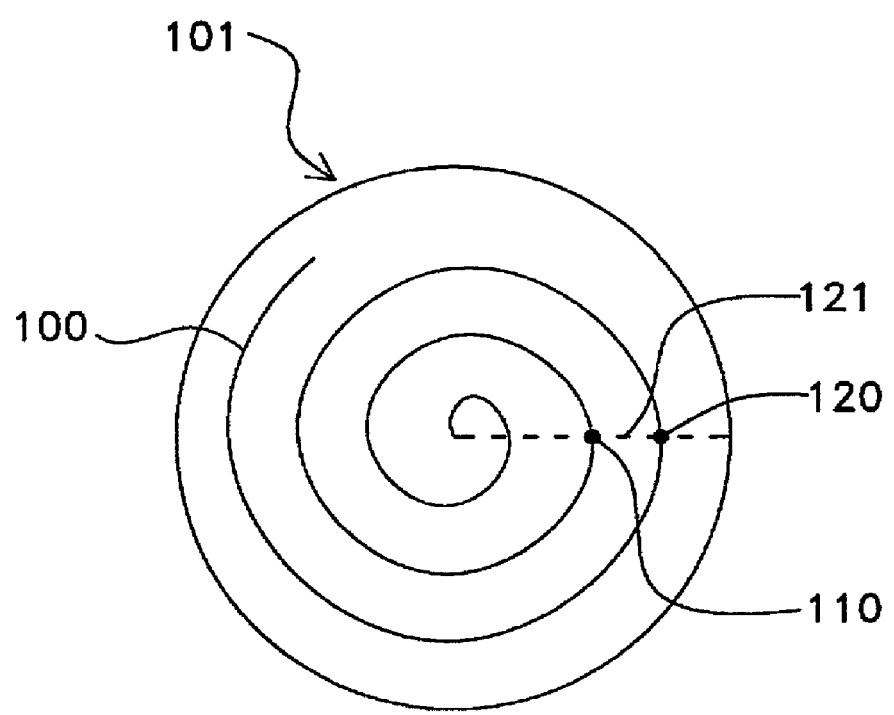
FIG. 1 is a diagram that illustrates the operation of a prior art pause technique.

The present invention relates to pause control for a player having a movable optical pickup. Referring more specifically to the drawings, for illustrative purposes the present invention is implemented in a system shown with respect to FIG. 2. Media player 200 includes at least a rotating optical medium, such as a disc 201, that has a spiral track 210 located on a recording surface of the medium. Note that spiral track 210 is used for the purpose of example only. A concentric track having multiple substantially circular patterns may be used in the present invention as well. An optical pickup 220 is used to direct at least one beam 230 onto the track 210. As the disc 201 spins, the pickup 220 is configured to cause the laser to follow the track 210 whereby data signals, error signals, and other information is detected by the pickup 220 when it senses the reflection of the beam 230 off the track 210.

Various patterns 240 exist in the track 210. This includes, for instance, a sub-code that contains a track ID that relates to the current location of the beam 230, as well as data patterns and other appropriate information. Control systems 295 are also coupled to the media player 200. The control systems 295 act, for instance, to guide the beam in the appropriate direction and to keep it centered on the spiral track 210. It should be noted that the system above might contain other elements (not shown) that are well known to those skilled in the art. An input area 250 is coupled to the media player 200 wherein a user is able to provide input to the system to cause it to act in a suitable manner. For instance, input area 250 might include a pause key 260, a search key 270, a play key 280, or other keys 290.

If the media player 200 is currently playing a song and the user wishes to pause the song, for instance, the user would depress pause key 260, which sends a signal to the system to initiate the actions needed to enter a pause state. Likewise, if the user wants to search somewhere else on the disc 201, they would depress the search key 270, and so on.

Pause Control

Figure 2:
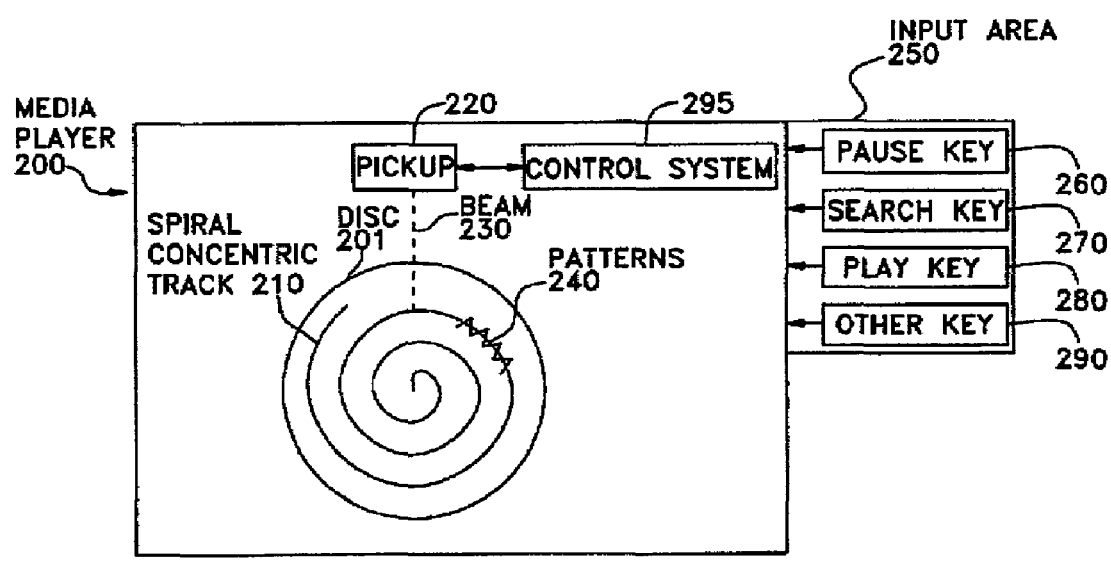
FIG. 2 is a block diagram of a player capable of implementing a simplified pause according to an embodiment of the present invention.
Figure 3:
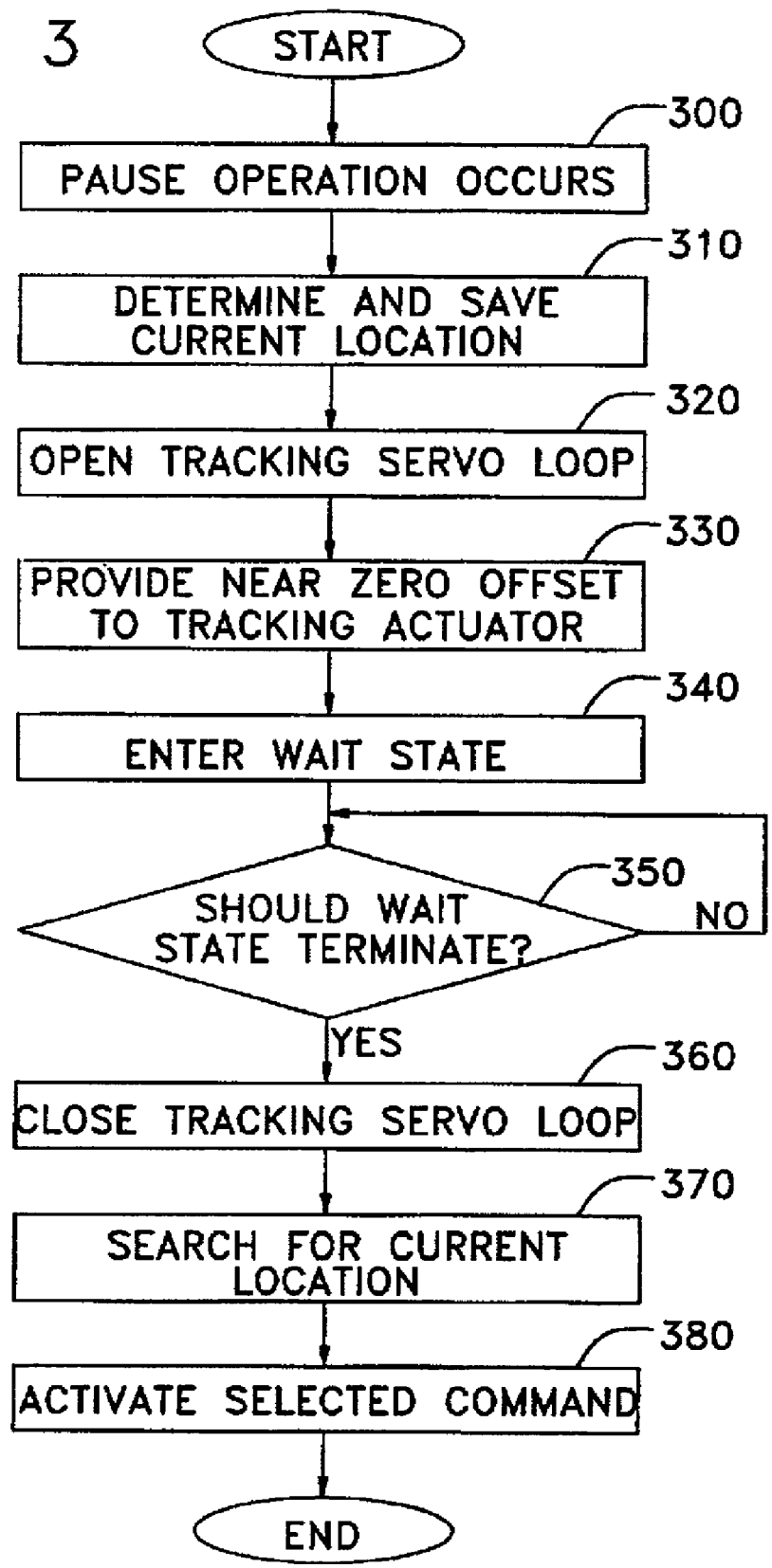
FIG. 3 is a flowchart showing the steps taken during a simplified pause according to an embodiment of the present invention.

The manner in which one embodiment of the present invention simplifies the use of a pause technique is shown in FIG. 3. At block 300 a pause operation occurs. The pause operation is initiated, for instance, by depressing a pause key as illustrated in FIG. 2. At block 310, the current location is determined and saved. At block 320, the tracking servo loop is opened. The tracking servo loop is a component of the control system described in block 295 of FIG. 2. At block 330 a near zero offset is provided for the tracking actuator. The providing of a near zero offset to the tracking actuator is described in more detail below. It functions generally to provide the system with information about where to place the lens. Since the tracking servo was opened at step 320, there is no tracking error signal to provide feedback telling the system where to place the lens. So, by providing a near zero offset the lens can remain as close as possible to the center of the track in the absence of a tracking error signal while the loop is open.

At block 340, a wait state is entered. At block 350, it is determined if the wait state should terminate. This may occur, for instance, if the user initiates a play, search, or some other function. If the wait state should not terminate, then block 350 repeats. Otherwise, at block 360 the tracking servo loop is closed. At block 370 the saved current location is searched for, and at block 380 the selected command is activated.

Figure 4:
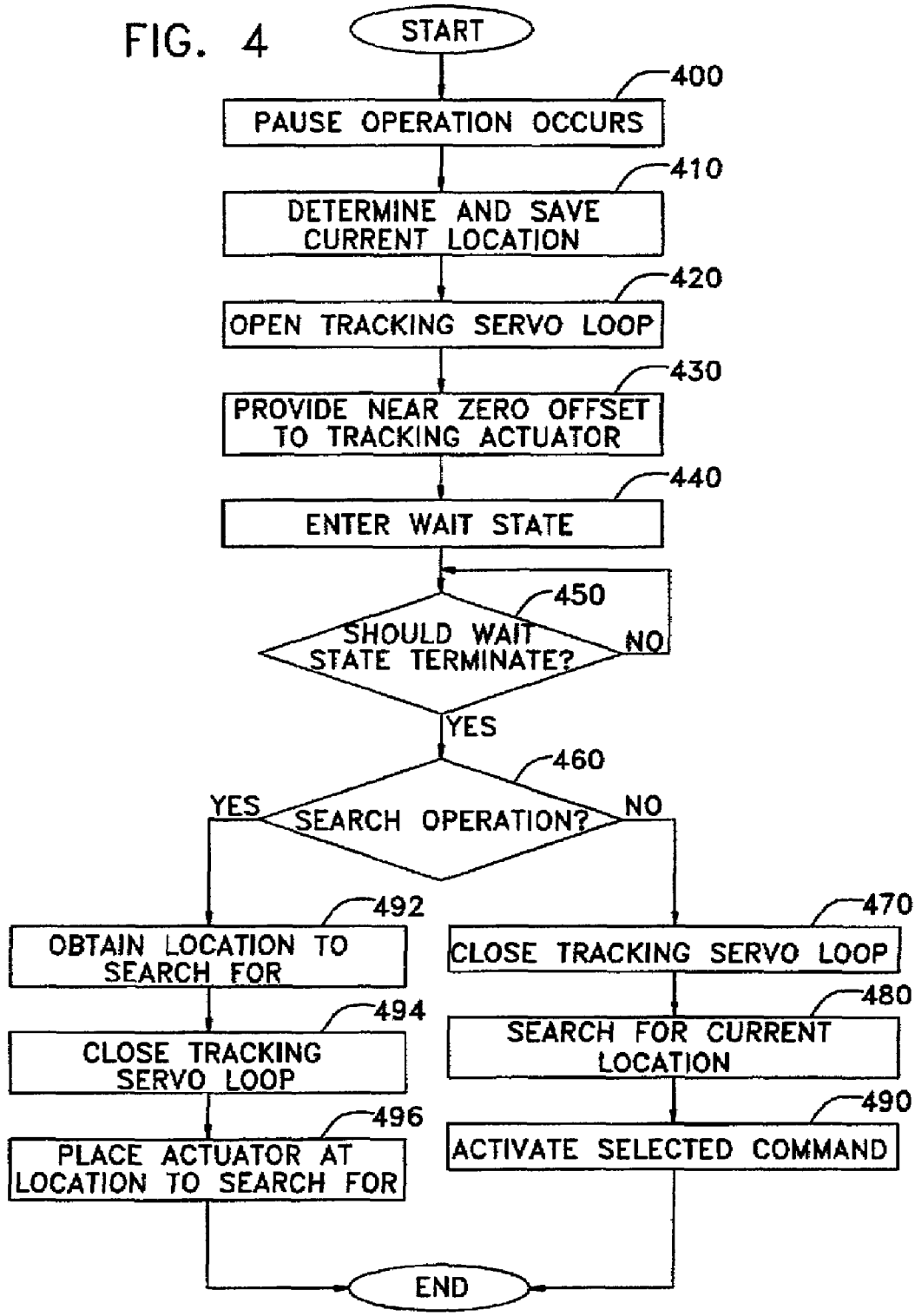
FIG. 4 is a flowchart showing the steps taken during a simplified pause according to another embodiment of the present invention.

FIG. 4 shows another embodiment of the present invention and how it handles the initiation of a search operation when it is in a wait state. At block 400 a pause operation occurs. At block 410, the current location is determined and saved. At block 420, the tracking servo loop is opened. At block 430 a near zero offset is provided for the tracking actuator. At block 440, a wait state is entered.

At block 450, it is determined if the wait state should terminate. If the wait state should not terminate, then block 450 repeats. Otherwise, at block 460 it is determined if a search operation is terminating the wait state. If not, then at block 470 the tracking servo loop is closed. At block 480 the saved current location is searched for, and at block 490 the selected command is activated. Otherwise, at block 460 a search function is terminating the wait state, so at block 492 the location to search for is obtained. At block 494, the tracking servo loop is closed and at block 496 the read beam is placed at the location to search for.

Figure 5:
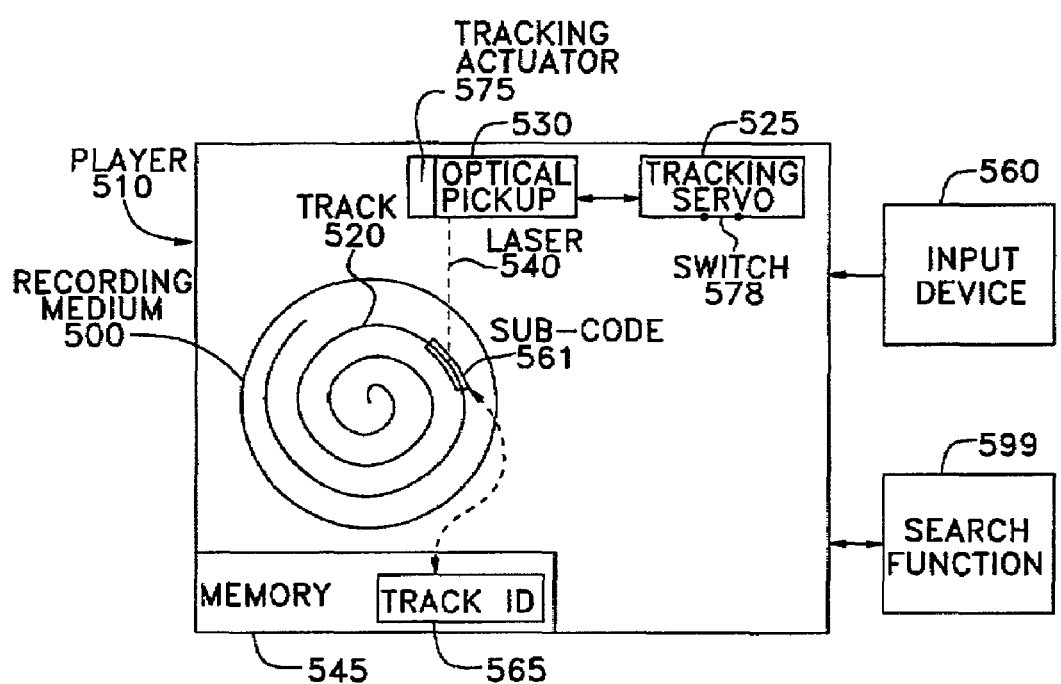
FIG. 5 is a block diagram of a player capable of implementing a simplified pause according to an embodiment of the present invention.

FIG. 5 is a block diagram of a media player that implements a simplified pause according to an embodiment of the present invention. Recording medium 500 is used by player 510 to play data embedded in a track 520 in the medium. It should be noted that medium 500, by way of example, is a circular disc having a spiral track. The present invention, however, is not limited to such a medium. An optical pickup 530 is used to direct a laser 540 onto the surface of recording medium 500. A tracking servo 525 is used to control and guide the laser along the track 520. Laser 540 in optical pickup 530 is shown for the purpose of example only. The present invention may also implement electrical, radio, or other suitable signals from the pickup 530.

Player 510 also includes a memory 545. A device for input 560 is used wherein a user can implement a pause or other operation, for instance by depressing a button or using a remote control. In operation, once a pause operation is sensed at input device 560, the sub-code 561 embedded in the track is examined. The sub-code reveals a track ID 565, which is saved in memory 545. A switch 570 in the tracking servo 525 is then opened. This causes the motion of the optical pickup 530 to stop. A tracking actuator 575 in the optical pickup 530 is given a near zero offset. The near zero offset is provided, for instance, by a connection to ground or an offset device in the tracking servo 525. Once the offset is provided, the system waits for the wait state to terminate. When it does, switch 570 is closed and track ID 565 is obtained from memory 545. The actuator 570 then moves the pickup 530 such that laser 540 is directed to the location of the track ID 565, for instance using a search function 599, and the selected command that terminated the wait state is activated.

Figure 6:
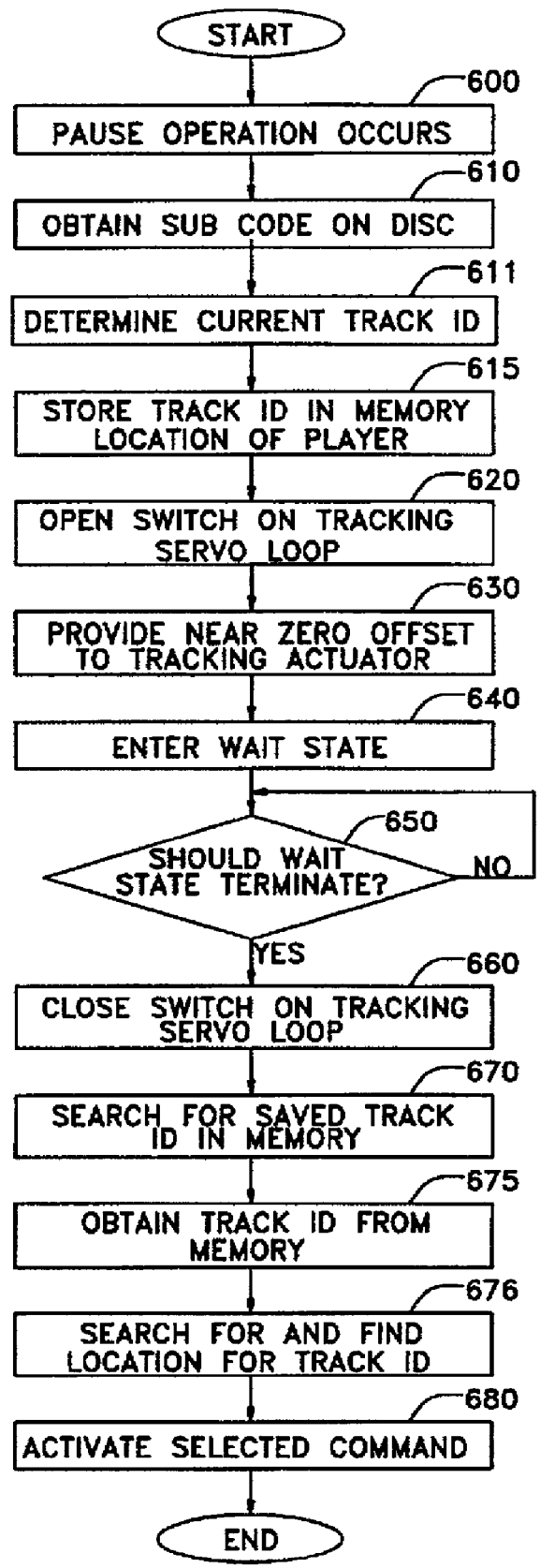
FIG. 6 is a flowchart showing the steps taken during a simplified pause according to yet another embodiment of the present invention.

FIG. 6 is a flowchart showing another embodiment of the present invention that is configured to operate on the system described in FIG. 5. At block 600 a pause operation occurs. At block 610, the sub-code on the disc is obtained. At block 611, current track ID is determined. This may occur, for instance by deciphering the sub-code on the disc. Typically the sub-code is scrambled in a manner wherein one sub-code is not contiguous but spread throughout a given area on the track in a known manner. Various methods for scrambling the sub-code are well known to those skilled in the art.

The sub-code is scrambled because discs and the like are subject to degradation on specific centralized locations. For example a scratch or defect in a small area might destroy data in that small area. By spreading the sub-code across a larger area and employing error detection mechanisms, the entire sub-code is not lost if a defect occurs in a small area. At block 615, the track ID, which was obtained from the deciphered sub-code, is stored in a memory location of the player. At block 620, a switch on the tracking servo loop is opened. At block 630 a near zero offset is provided for the tracking actuator. At block 640, a wait state is entered.

At block 650, it is determined if the wait state should terminate. This may occur, for instance, if the user initiates a play, search, or some other function. If the wait state should not terminate, then block 650 repeats. Otherwise, at block 660 the tracking servo loop is closed by closing the switch that was opened at block 620. At block 670 the saved track ID is searched for in memory. At block 675, the track ID is obtained from the memory. At block 676 the location for the track ID is searched for and found, and at block 680 the selected command is activated.

Near Zero Offset

Within the optical pickup of an optical media player there are one or more driver devices that control the position of the lens. The tracking servo keeps the lens centered on the information track by using a tracking error signal in a feedback loop. When the pause state is entered, the tracking servo loop is opened so the tracking error signal stops directing the position of the lens. In this state there is no incentive for the lens to be in any position because there is no signal to the lens. In one or more embodiments of the present invention, a near zero offset is provided to the tracking actuator when a pause operation is initiated and after the tracking servo loop is opened. In this manner, it is ensured that the lens is as near to the center of the information track as possible so that when the tracking servo loop is again closed, the lens needs to be moved the minimal distance.

It is possible to use the present invention by not providing any offset at all to the tracking actuator. In this case, when the tracking servo loop is again closed, there will be a large error signal. The tracking servo loop will eventually drive the lens position back to the center of the track, but it will take more time moving the carriage back to center. The near zero offset is implemented, for instance by adding a connection to ground to the tracking servo, or by adding an offset device in the tracking servo configured to provide a near zero offset tot he tracking actuator. Theoretically, a zero offset would be an ideal offset to provide to the tracking actuator, but in reality it is impossible to generate a signal having a voltage of exactly zero.

Acceptable Error

It should be noted that the simplified pause mechanisms of the embodiments of the present invention described with respect to FIGS. 2 through 6 above are precise. This means that the exact location that the pickup was at when the pause operation started is the location that will be used when the pause operation terminates. In some applications, however, when exiting the wait state, it is acceptable to allow for a small amount of error. These applications include, for instance, the use of a CD player, where it is tolerable for the user to start a PAUSE at a first location and to finish the PAUSE at a second location, wherein the first and second locations are reasonably close together but not at the same location.

An acceptable amount of error may be introduced when the tracking servo loop is opened initially in response to the initiation of the wait state. For example, a system when stopped may be subject to eccentricity or imperfections in the manufacture of the disc that cause the pickup to move across tracks. Based on manufacturer"s standards, this movement should not exceed a pre-defined limit, fifty tracks for example. When the wait state terminates, the tracking servo loop is closed and a tracking error signal is provided to the tracking actuator, which focuses the laser beam back onto the track rather than searching of the track ID. The location where the beam focuses back onto the track will not exceed a pre-determined number of tracks away from the stored track ID and simplifies the process by removing the need to store the track ID and to search for it later.

Figure 7:
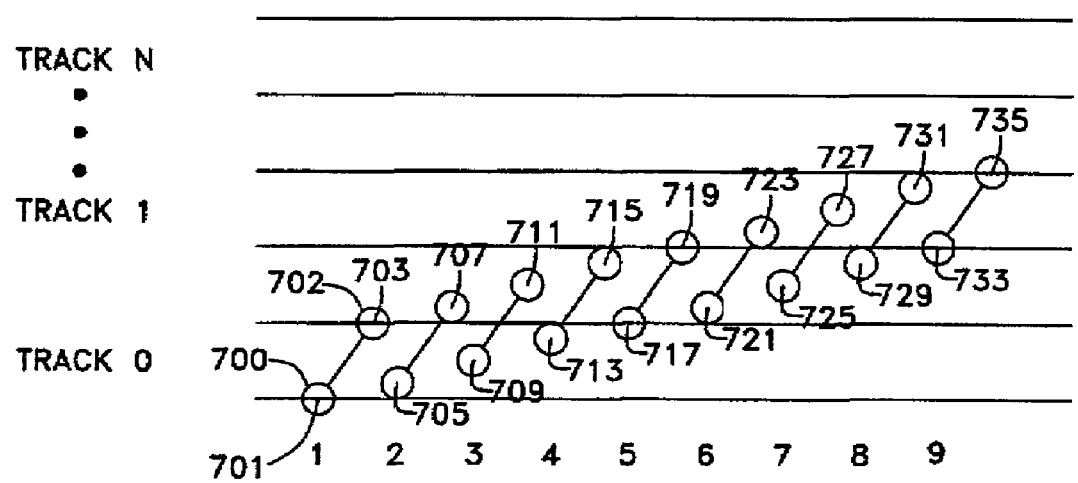
FIG. 7 is a diagram showing the movement of two tracking beams between tracks.

FIG. 7 is a diagram showing a position of a beam as it moves between tracks and how the error signal is used to focus it on a given track. In the present example a two beam tracking system is used, although it should be noted that single or triple beam tracking systems can be used as well. FIG. 7 includes three tracks, track 0, track 1, and track n. Beam 700 is in position 701 and beam 702 is in position 703 at time 1. Beam 700 is in position 705 and beam 702 is in position 707 at time 2. Beam 700 is in position 709 and beam 702 is in position 711 at time 3. Beam 700 is in position 713 and beam 702 is in position 715 at time 4. Beam 700 is in position 717 and beam 702 is in position 719 at time 5. Beam 700 is in position 721 and beam 702 is in position 723 at time 6. Beam 700 is in position 725 and beam 702 is in position 727 at time 7. Beam 700 is in position 729 and beam 702 is in position 731 at time 8. Beam 700 is in position 733 and beam 702 is in position 735 at time 9.

Thus, times 1 through 9 track the position of the beams as they move between tracks 1 and 2. When the beam 700 is tracked through times 1 through 9, its voltage values are shown in Table 1:

TABLE 1

|  | 1 | 2 | 3 | 4 | 5 | 6 | 7 | 8 | 9 |
|---|---|---|---|---|---|---|---|---|---|
| Beam 700 | .5 v | .75 v | 1 v | .75 v | .5 v | .25 v | 0 v | .25 v | .5 v |
| Beam 702 | −.5 v | −.25 v | 0 v | −.25 v | −.5 v | −.75 v | −1 v | −.75 v | −.5 v |

Figure 8:
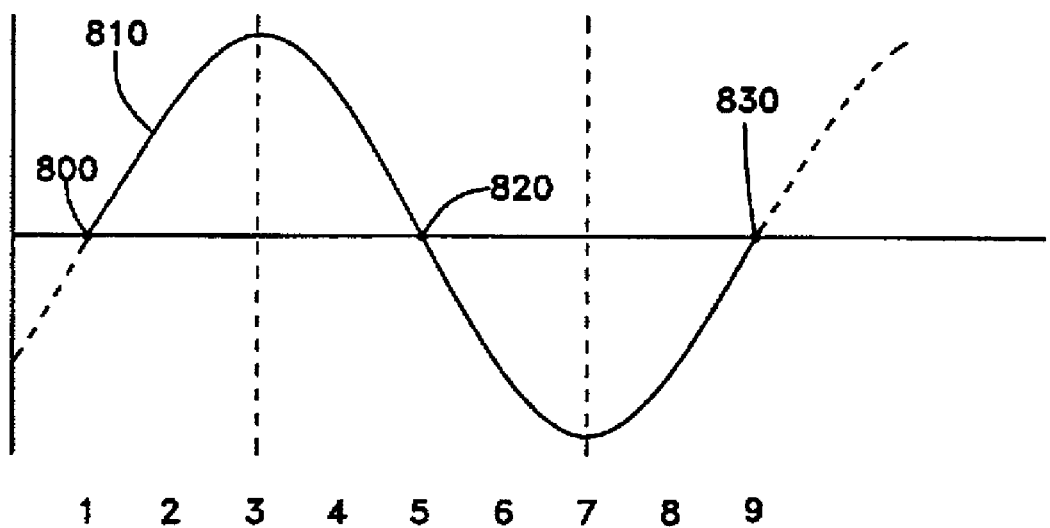
FIG. 8 is a diagram of a waveform generated by the motion of the tracking beams of FIG. 7.

By summing the voltage values of beams 100 and 102 through positions 1 through 9, a sinusoidal curve is generated as shown in FIG. 8, where point 800 of curve 810 corresponds to the center of track 0 in FIG. 7. Correspondingly, point 820 the position directly between tracks 0 and 1 and point 830 is the position in the center of track 1.

Figure 9:
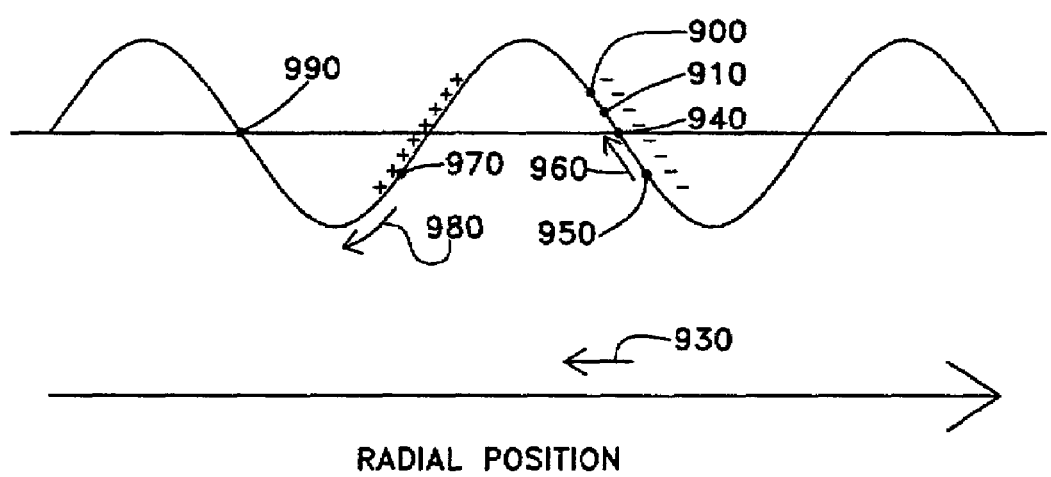
FIG. 9 is a waveform showing an error tracking signal as it focuses a beam on the track of a disk.

Thus, with respect to the radial position of the pickup, an error signal is generated as shown in FIG. 9. If the pause state is exited at point 900 of FIG. 9, then as the radial position moves to the right on the diagram, the amplitude of negative slope 910 decreases. The decrease in amplitude is used to drive the radial position in the direction of arrow 930 to counter the voltage, until the signal reaches point 940 wherein it is centered on the track. Likewise, if position 950 is the location where the pause state exits, then the signal is driven in the direction of arrow 960 toward point 940.

When the tracking servo loop is closed in response to the termination of a wait state, the signal may be in a positive portion of its slope 970. In this case, the tracking signal will guide the beam back to the track as indicated by arrow 980 until it eventually centers itself at point 990. In either case, the signal will center itself on the track and the wait state will terminate. The location where the wait state terminates will be a pre-determined maximum distance from the location where the wait state was initiated. In many applications, this pre-determined distance is 50 tracks.

Figure 10:
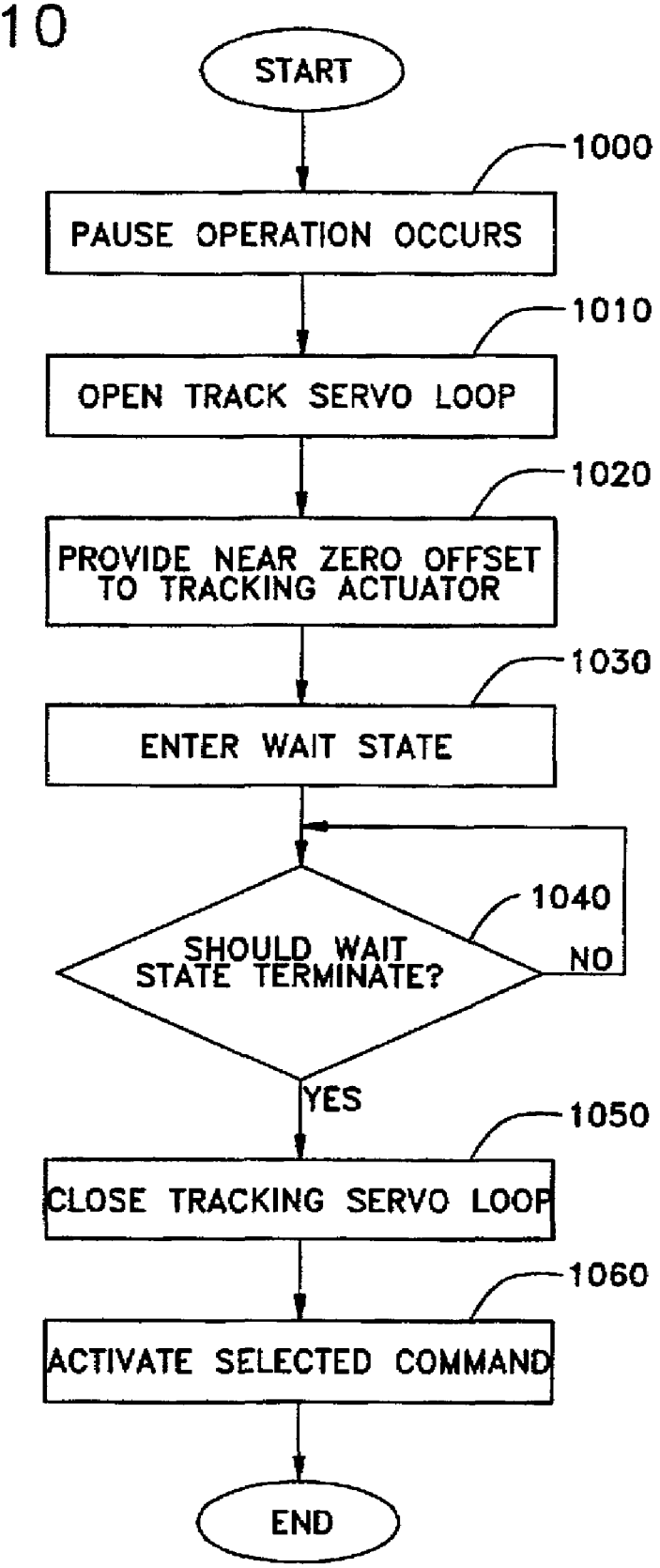
FIG. 10 is a flowchart showing the steps taken during a simplified pause that allows for an acceptable error according to an embodiment of the present invention.

The steps taken by an embodiment of the present invention that allows for an acceptable error are shown in FIG. 10. At block 1000 a pause operation occurs. At block 1010, the tracking servo loop is opened. At block 1020 a near zero offset is provided for the tracking actuator. At block 1030, a wait state is entered. At block 1040, it is determined if the wait state should terminate. If the wait state should not terminate, then block 1040 repeats. Otherwise, at block 1050 the tracking servo loop is closed and at block 1060 the selected command is activated.

Limited Domain Search

The present invention is configured to use any search algorithm known to those skilled in the art. In cases where acceptable error is not tolerable, it is desirable to perform a search function within the range of acceptable error. This is termed a limited domain search. Performing a limited domain search is beneficial because it reduces the domain for the search, thereby reducing the instructions that must be computed by the player in performing the search.

Scenarios where it is not tolerable to have error include, for instance, CD-R applications where data is being recorded onto the spiral track. In this case to not record data to fifty tracks or some other pre-determined amount might result in an inoperable disc. Similarly, a CD-ROM application might not tolerate any error because data is being read that is needed to operate an executing computer program. An error in this scenario might result in a crashed computer program.

In cases such as these, a search algorithm is employed once the wait state terminates. For example, it is known that implementing the steps of opening the servo loop in response to a wait state and closing it in response to its termination of the wait state results in a maximum error of a pre-defined amount (e.g., fifty tracks). A search algorithm used by the present invention may be limited to the domain of the pre-defined amount and thereby reduce the amount of tracks it searches over.

One example of a search algorithm is called a hunting method. In the limited domain of a fifty track maximum error, one example of how the algorithm could operate is as follows. The system would jump back 20 tracks, close the tracking servo loop, play the system briefly, and determine the present location compared to the saved track ID. If the present location was still too far ahead, it would jump back 20 tracks again and repeat. When the system jumped too far, it would jump forward again at a smaller interval, and the process repeats until the system jumps to a location just slightly proceeding the desired track. At that point the system is started and the sound or other data output is initiated when it reaches the track ID that was saved when the wait state began.

FIG. 11 is a flowchart showing the use of a search algorithm within an acceptable error range according to an embodiment of the present invention. At block 1100 a pause operation occurs. At block 1105 the current location is saved. At block 1110, the tracking servo loop is opened. At block 1120 a near zero offset is provided for the tracking actuator. At block 1130, a wait state is entered. At block 1140, it is determined if the wait state should terminate. If the wait state should not terminate, then block 1140 repeats. Otherwise, at block 1150 the tracking servo loop is closed. At block 1160, a search algorithm is employed within the range of acceptable error. At block 1170, the current location saved in block 1105 is obtained using the restricted domain search algorithm, and at block 1180 the selected command is activated.

Although the description above contains many specificities, these should not be construed as limiting the scope of the invention but as merely providing illustrations of some of the presently preferred embodiments of this invention. Thus the scope of this invention should be determined by the appended claims and their legal equivalents.

What is claimed is:

1. A method comprising:
   providing for use of a player operating with a tracking servo loop that is currently closed;
   determining a current location of a pickup;
   storing said current location of said pickup;
   opening said tracking servo loop;
   providing a near zero offset for a tracking actuator; and
   closing said tracking servo loop, when a function is selected, wherein said near zero offset is used as an initial input for said tracking servo loop after it is closed again.

2. The method of claim 1 further comprising, moving said pickup to said current location.

3. The method of claim 2 wherein said step of storing comprises placing said current location in a memory area.

4. The method of claim 3 wherein said step of moving further comprises obtaining said current location from said memory area.

5. The method of claim 1 wherein said function comprises a play function.

6. The method of claim 1 wherein said function comprises a search function.

7. The method of claim 1 wherein said function comprises a record function.

8. The method of claim 1 wherein said step of storing comprises placing said current location in a memory area.

9. The method of claim 1 wherein said tracking servo loop includes a switch.

10. The method of claim 9 wherein said step of opening further comprises opening said switch.

11. The method of claim 10 wherein said step of closing further comprises closing said switch.

12. The method of claim 1 wherein said current location comprises a track ID or a frame ID.

13. The method of claim 12 wherein said track ID or said frame ID is embedded in a track on an optical medium.

14. The method of claim 13 wherein said track is a spiral or a concentric track.

15. The method of claim 14 wherein said optical medium is a substantially circular disc.

16. The method of claim 1 wherein s aid step of determining further comprises: obtaining a sub-code from an information track; and extracting a track ID from said sub-code.

17. The method of claim 1 wherein said rotating media player comprises an optical disc storage device.

18. The method of claim 17 wherein said optical disc storage device is a CD-ROM, a video laser disc player, a mini-disc player, a CD player, a CD rewritable player, a DVD player, a CD-recordable player, or a magneto-optical player.

19. An apparatus comprising:
   a tracking servo loop that is currently closed;
   a pickup associated with said tracking servo loop, said pickup configured to have a current location determined;
   a storage area for said current location of said pickup; and
   a tracking actuator in said pickup, said actuator configured to receive a near zero offset after opening said tracking servo loop,
   said tracking servo loop configured to be closed when a function is selected wherein said near zero offset is used as an initial input for said tracking servo loop after it is closed.

20. The apparatus of claim 19 wherein said pickup is configured to be moved to said current location.

21. The apparatus of claim 20 wherein said storage area comprises a memory area.

22. The apparatus of claim 21 wherein said current location is obtained from said memory area before said pickup is moved.

23. The apparatus of claim 19 wherein said function comprises a play function.

24. The apparatus of claim 19 wherein said function comprises a search function.

25. The apparatus of claim 19 wherein said function comprises a record function.

26. The apparatus of claim 19 wherein said storage area comprises a memory area.

27. The apparatus of claim 19 wherein said tracking servo loop includes a switch.

28. The apparatus of claim 27 wherein said tracking servo loop is opened by opening said switch.

29. The apparatus of claim 28 wherein said tracking servo loop is closed by closing said switch.

30. The apparatus of claim 19 wherein said current location comprises a track ID or a frame ID embedded in a track on an optical medium.

31. The apparatus of claim 30 wherein said optical medium is a circular disc.

32. The apparatus of claim 19 wherein said current location of said pickup comprises:
   a sub-code configured to be obtained from an information track; and
   a track ID configured to be extracted from said sub-code.

33. The apparatus of claim 19 wherein said media player comprises an optical disc storage device.

34. The apparatus of claim 33 wherein said optical disc storage device is a CD-ROM, a video laser disc player, a mini-disc player, a CD player, a CD rewritable player, a DVD player, a CD-recordable player, or a magneto-optical player.

35. A system comprising:
   means for operating a player with a tracking servo loop that is currently closed;
   means for determining a current location of a pickup in said player;
   means for storing said current location of said pickup;
   means for opening said tracking servo loop;
   means for providing a near zero offset for a tracking actuator in said pickup; and
   means for closing said tracking servo loop, when a function is selected wherein said near zero offset is used as an initial input for said tracking servo loop after it is closed again.

36. The system of claim 35 further comprising means for moving said pickup to said current location.

37. The system of claim 36 wherein said means for storing comprises means for placing said current location in a memory area.

38. The system of claim 37 wherein said means for moving further comprises means for obtaining said current location from said memory area.

39. The system of claim 36 wherein said means for determining a current location further comprises:
   means for obtaining a sub-code from an information track; and
   means for extracting a track ID from said sub-code.

40. The system of claim 35 wherein said function comprises a play function.

41. The system of claim 35 wherein said function comprises a record function.

42. The system of claim 35 wherein said function comprises a search function.

43. The system of claim 35 wherein said means for storing comprises means for placing said current location in a memory area.

44. The system of claim 35 wherein said tracking servo loop includes a switch.

45. The system of claim 44 wherein said means for opening further comprises means for opening said switch.

46. The system of claim 45 wherein said means for closing further comprises means for closing said switch.

47. The system of claim 35 wherein said current location comprises a track ID or a frame ID.

48. The system of claim 47 wherein said optical medium is a substantially circular disc and said track ID or said frame ID is embedded in a track on said substantially circular disc.

49. The system of claim 35 wherein said rotating media player comprises an optical disc storage device.

50. The system of claim 49 wherein said optical disc storage device comprises a CD-ROM, a video laser disc player, a mini-disc player, a CD player, a CD rewritable player, a DVD player, a CD-recordable player, or a magneto-optical player.

51. A computer program product comprising:
   a computer usable medium having computer readable program code embodied therein comprising:
   computer readable program code configured to cause a computer to provide for use of a player operating with a tracking servo loop that is currently closed;
   computer readable program code configured to cause a computer to determine a current location of a pickup in said player;
   computer readable program code configured to cause a computer to store said current location of said pickup;
   computer readable program code configured to cause a computer to open said tracking servo loop;
   computer readable program code configured to cause a computer to provide a near zero offset for a tracking actuator in said pickup; and
   computer readable program code configured to cause a computer to close said tracking servo loop, when a function is selected wherein said near zero offset is used as an initial Input for said tracking servo loop after it is closed.

52. The computer program product of claim 51 further comprising computer readable program code configured to cause a computer to move said pickup to said current location.

53. The computer program product of claim 52 wherein said computer readable program code configured to cause a computer to store comprises computer readable program code configured to cause a computer to place said current location in a memory area.

54. The computer program product of claim 53 wherein said computer readable program code configured to cause a computer to move further comprises computer readable program code configured to cause a computer to obtain said current location from said memory area.

55. The computer program product of claim 51 wherein said function comprises a play function.

56. The computer program product of claim 51 wherein said function comprises a search function.

57. The computer program product of claim 51 wherein said function comprises a record function.

58. The computer program product of claim 51 wherein said computer readable program code configured to cause a computer to store comprises computer readable program code configured to cause a computer to place said current location in a memory area.

59. The computer program product of claim 51 wherein said tracking servo loop includes a switch.

60. The computer program product of claim 59 wherein said computer readable program code configured to cause a computer to open further comprises computer readable program code configured to cause a computer to open said switch.

61. The computer program product of claim 60 wherein said computer readable program code configured to cause a computer to close further comprises computer readable program code configured to cause a computer to close said switch.

62. The computer program product of claim 51 wherein said current location comprises a track ID or a frame ID.

63. The computer program product of claim 62 wherein said track ID or said frame ID is embedded in a track on an optical medium.

64. The computer program product of claim 63 wherein said track is a spiral or a concentric track.

65. The computer program product of claim 64 wherein said optical medium is a substantially circular disc.

66. The computer program product of claim 51 wherein said computer readable program code configured to cause a computer to determine further comprises:

computer readable program code configured to cause a computer to obtain a sub-code from an information track; and computer readable program code configured to cause a computer to extract a track ID from said sub-code.

67. The computer program product of claim 51 wherein said rotating media player comprises an optical disc storage device.

68. The computer program product of claim 67 wherein said optical disc storage device is a CD-ROM, a video laser disc player, a mini-disc player, a CD player, a CD rewritable player, a DVD player, a CD-recordable player, or a magneto-optical player.

* * * * *